United States Patent Office 3,009,305
Patented Nov. 21, 1961

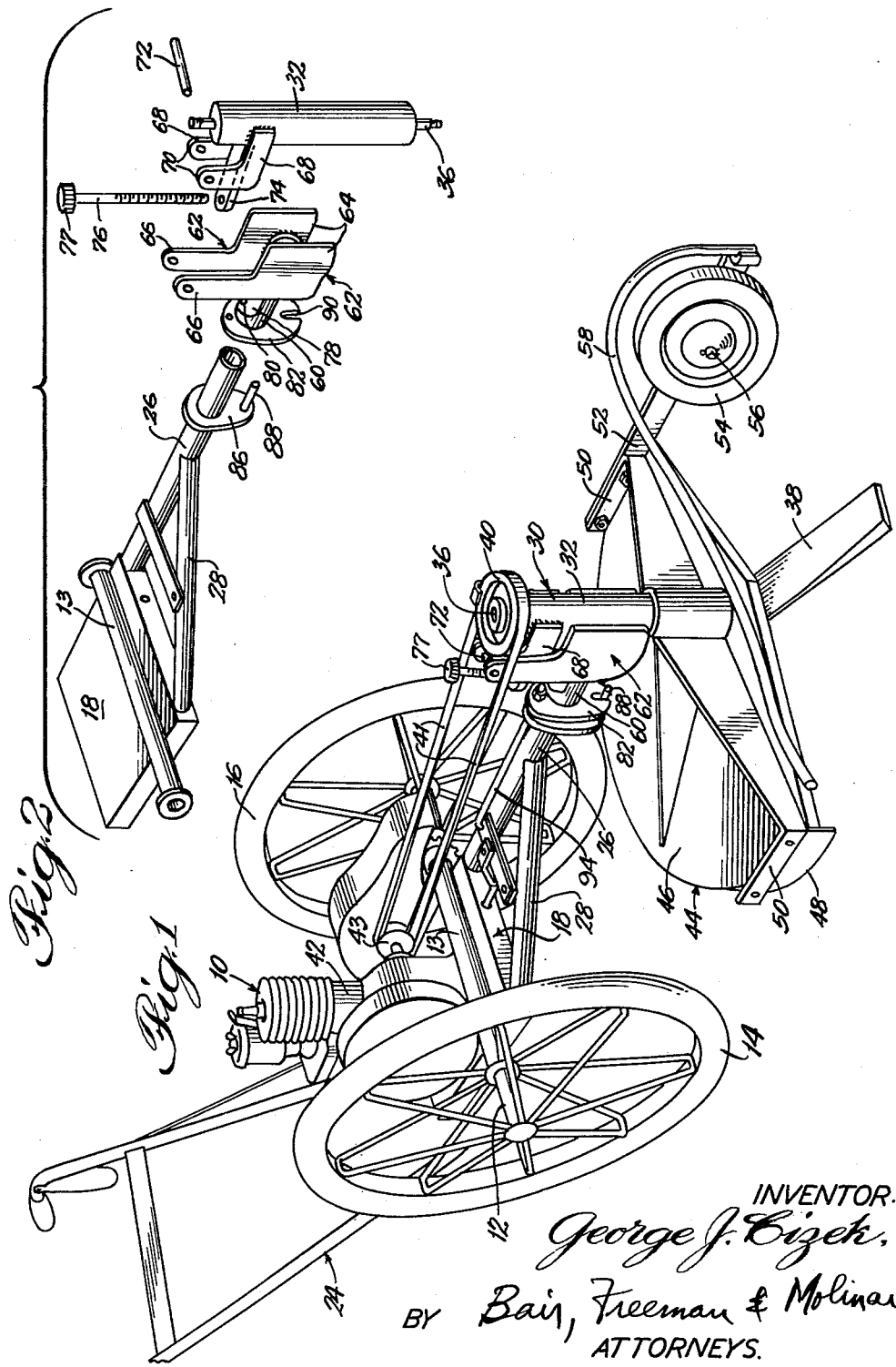

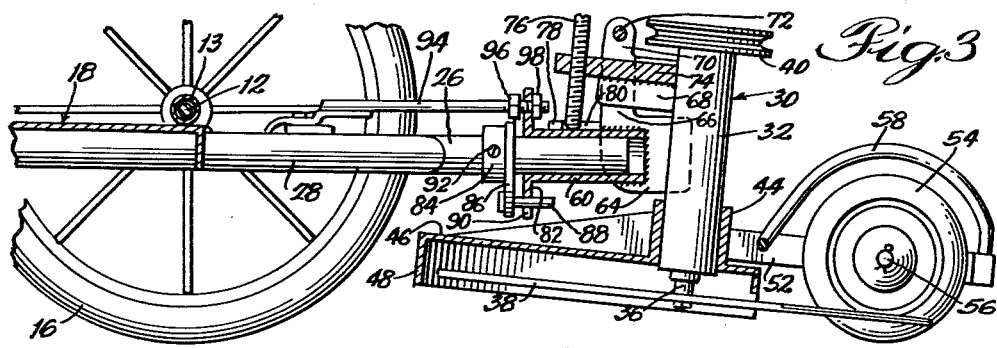

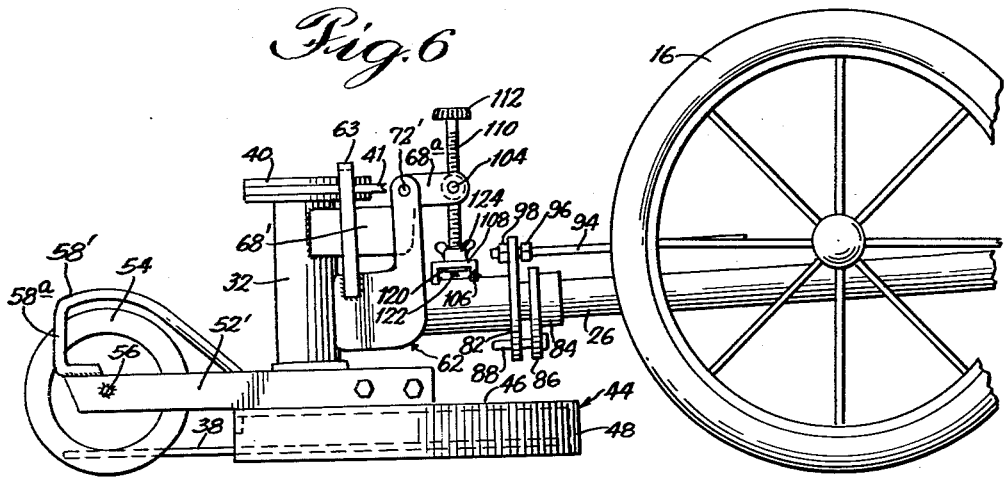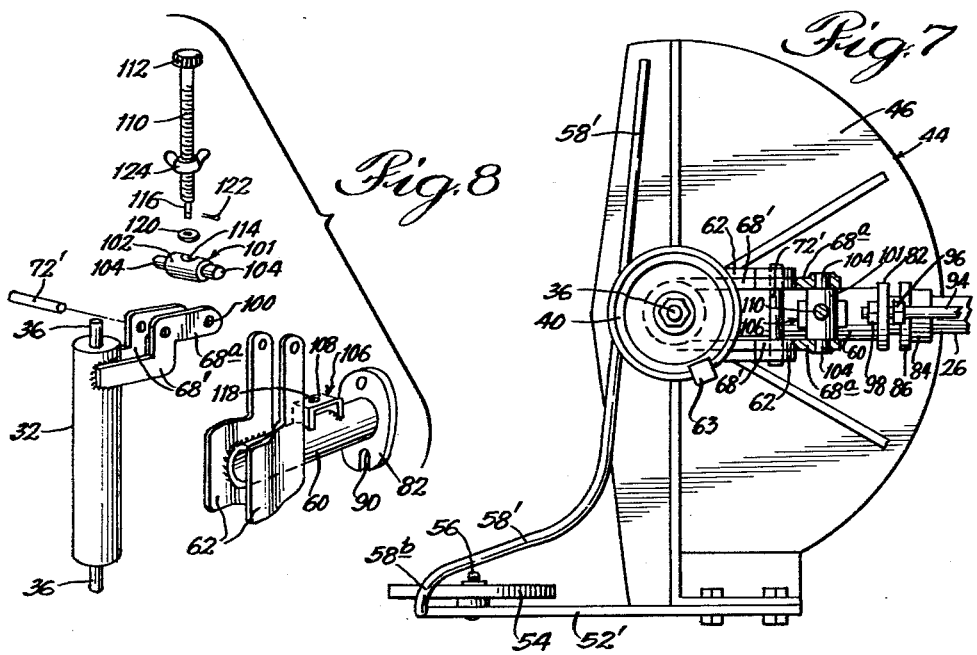

3,009,305
MOWING MACHINE WITH PITCH
CONTROL THEREFOR
George J. Cizek, Clutier, Iowa
Filed Jan. 12, 1959, Ser. No. 786,087
6 Claims. (Cl. 56—25.4)

This invention relates to improvements in mowing machines, and more particularly relates to a blade-pitch control therefor. This application is a continuation-in-part of my copending application, Serial No. 754,787, filed August 13, 1958.

Mowing machines of the type having a blade rotatable about a substantially vertical axis have recently become very popular. The present invention is directed to such a mower with a particular blade-pitch control for such a mower. Mowers of the type having blades which are rotatable about an upright axis have heretofore been produced with the cutter head either fixed relative to a wheel-supported frame or floating (rotatable about a horizontal axis) relative to the wheel-supported frame. In all such machines the cutter is normally continuously driven by a belt means.

Mowers of the type having blades which are rotatable about a vertical axis and which have adjustable means for varying the pitch of the cutter blades are old in the art, as shown in Noel 2,114,096. The instant invention is directed, in part, to an improved and simplified means for varying the pitch of cutter blades of a mower wherein the cutter blades are rotatable about a vertical axis.

Thus, the object of this invention is to provide a simplfied means for selectively varying the pitch of the cutter blades of a mower, wherein the cutter is rotatable about a vertical axis.

Another object of this invention is to provide a simplified blade pitch control for a mover having a cutter blade rotatable about a vertical axis, wherein the blade-pitch control is connected directly to the means which supports the cutter blade thereby providing a simplified pitch control for the mower.

Still another object of this invention is to provide a mower with a simplified blade-pitch control therefor which is characterized by the novel and convenient location of said blade-pitch control.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a perspective view of a mowing machine embodying the improvements herein disclosed.

FIGURE 2 is an exploded view of parts of the enlarged, fragmentary, side elevation frame of the mowing machine and of the blade-pitch control therefor.

FIGURE 3 is a fragmentary, vertical cross-section view of the machine of FIGURE 1 showing the cutter blade at one angle of pitch.

FIGURE 4 is similar to FIGURE 3, and shows the position of parts when the cutter blade is at another angle of pitch.

FIGURE 5 is a fragmentary top plan view of the machine of FIGURE 1.

FIGURE 6 is a fragmentary side elevational view of a mowing machine illustrating, inter alia, certain modifications in the blade-pitch control means for the machine, and FIGURE 6 is taken looking at a mowing machine from a direction opposite to the direction of view of FIGURES 3 and 4.

FIGURE 7 is a fragmentary top plan view of the device shown in FIGURE 6.

FIGURE 8 is an exploded view similar in some respects with FIGURE 2, but showing the elements of the modified blade-pitch control means shown in FIGURES 6 and 7.

Referring now to the drawings, there is illustrated in FIGURE 1 a motor-driven weed mowing machine generally indicated at 10, having a wheel-supported frame including axle means 12, and a pair of ground-engaging support wheels 14 and 16. The frame 18 is positioned below the axle means 12 and is supported therefrom by any appropriate means. In the preferred form shown, the frame 18 is welded to a sleeve 13 within which the axle 12 is journaled. A handle means 24 extends rearwardly from the frame 18 and provides a pair of handle bars by means of which the mower 10 may be guided.

Referring now specifically to frame 18, said frame has a forwardly extending support member, or arm, 26 upon which is mounted the cutter head assembly 30 of the mowing machine. The forwardly extending arm 26 of the frame is rigidified by means of a diagonal brace member 28.

The cutter head assembly 30 includes an upright, elongated, tubular bearing 32 which has its axis extending transversely to the longitudinal axis of arm 26. Rotatably mounted in bearing 32 is an elongated shaft 36 having its ends projecting from both ends of the bearing 32. A cutter means 38 is mounted on the lower end of shaft 36 and is arranged for rotation in a plane transverse to the axis of bearing 32. The upper end of shaft 36 has a pulley 40 connected thereto for rotation therewith. The cutter means 38 is driven through the medium of an endless flexible drive belt 41 which is trained over the driven pulley 40 and which extends rearwardly toward frame 18 where it is driven by power means carried thereon and which operates in a manner as more fully described in said copending application, Serial No. 754,787. The power means for driving flexible belt 41 is shown as including an internal combustion motor 42 and a pulley 43 driven thereby over which is trained the flexible belt 41.

The cutter head assembly 30 includes a shield structure generally indicated at 44 which is carried on the upright tubular bearing 32. The shield structure 44 includes a flat plate member 46 which overlies the cutter means 38 and which has a depending arcuate guard flange 48 extending downwardly therefrom and positioned outwardly of the end of cutter blade 38. The plate member 46 has a pair of upstanding flanges 50 provided at opposite lateral sides thereof, and the upstanding flange 50 provides means for attachment thereto of a ground-engaging means which extends forwardly of bearing 32. As shown specifically in the drawings, the ground-engaging means includes a forwardly extending bar 52 which is appropriately secured, such as by bolts and the like, to one of the upstanding flanges 50. The forwardly extending bar 52 carries thereon a ground-engaging wheel 54, which is journaled for rotation on a pin, or axle, 56 carried by bar 52. There is also provided a rearwardly sweeping bar 58 which is secured at one end to the forwardly extending bar 52, and which arches upwardly and rearwardly toward the other side of the plate member 46, and thereby provides a sweep means which serves to sweep the cut weeds to one side of the machine as the machine moves forwardly into the weeds which are to be cut.

It will be seen, from what has thus far been described, that, in the absence of any connection between the forwardly projecting arm 26 of the frame and the cutter head assembly 30, said forwardly projecting portion 26 of the frame normally tends to swing downwardly toward the ground and the rearwardly extending portion of the cutter head 30 normally tends to swing downwardly, relative to wheel 54, toward the ground. By connecting the said two sections together, each provides, in part, a support means for the other. The details of connection of the cutter head assembly 30 to the forwardly projecting arm portion 26 of the frame is shown more fully in FIGURES 2 to 5.

There is telescopically mounted on the forward end of support member 26 a slidable sleeve 60. Welded to opposite sides of the sleeve 60 are a pair of parallel, uprightly flange plates 62 each having a forwardly projecting ear 64 and an upwardly projecting arm 66. Extending rearwardly from the upright tubular bearing 32 are a pair of parallel, rearwardly extending flange plates 68 each having an upwardly extending arm 70. The flange plates 68 are welded to the tubular bearing 32 and are spaced apart a distance less than the spacing of the arms 66. A pivot pin 72 slidably extends through each of the arms 66 and 70, thereby pivotally connecting the head assembly 30 to the forward arm 26 of the frame and permitting of varying the angle between the axis of bearing 32 and the axis of arm 26. A pitch control means is provided which interacts between the pivoted bearing 32 and elongated support member 26 for varying the pitch of cutter 38 relative to the axis of member 26.

There is a tapped flange, or arm, 74 welded to the upright tubular bearing 32 and extending rearwardly therefrom, and located above arm 26, and having threaded in the tapped bore thereof a screw control member 76, having a manual grip 77 at the upper end and the lower end of which is adapted to bear against the upper side of sleeve 60. The sleeve 60 carries thereon a guide 78 having an elongated slot 80 therein, and the lower end of screw 76 enters through slot 80 and moves along the length thereof through the range over which the pitch of cutter 38 may be varied, and said lower end of screw 76 operates to engage the upper side of sleeve 60. The walls of flange 78 which bound slot 80 maintain the lower end of screw 76 in alignment with sleeve 60 and prevent relative lateral movement therebetween. It will be understood that by rotating the manual grip 77 of screw control 76 the pitch of the cutter means 38, relative to the axis of the forwardly projecting arm portion 26 of the frame, may be varied to positions as shown, for example, in FIGURES 3 and 4. It will be seen that the arms 70 are positioned adjacent the inner surfaces of arms 66, and the cooperation of these sets of arms 70 and 66 with each other and with pin 72 operates to maintain alignment of the axis of bearing 32 with the longitudinal axis of arm 26, thereby preventing relative lateral displacement therebetween at all attitudes and throughout the entire range of pivoting movement about the axis of pin 72. One of the plates 62 carries a shaped bracket 63 which serves as a belt guard to keep the belt 41 trained over pulley 40.

From the foregoing, it will be understood that the pivoting of the cutter head 30 relative to the wheel supported frame of the mowing machine is about the horizontal axis of pin 72 which lies transverse to both the axis of the elongated arm member 26 and the axis of the bearing 32, and, further, it will be seen that the axis of pin 72 is spaced above the elongated member 26 and is disposed raerwardly of the bearing 32. The arm 74 for carrying screw adjuster 76 is located between the flange plates 68, and the tapped portion of arm 74 and screw 76 are located rearwardly of pivot pin 72. The screw control 76 carries a lock nut (not shown) which keeps it from vibrating loose.

Referring now to the tubular sleeve 60, it will be seen that said sleeve 60 is provided with a flange 82. Adjustably mounted on the forwardly projecting frame member 26 is a hub 84 having a flange 86 which is arranged in facing relation with a portion of flange 82. The flanges 82 and 86 have telescoping parts which are displaced from the axis of the telescoped members 26 and 60 and which operate to prevent relative axial rotation of the telescoped members 26 and 60. More specifically, the flange 86 carries a forwardly projecting finger 88 which extends through and cooperates with a notch 90 in flange 82, and such cooperation maintains the cutter head assembly 30 non-rotative relative to the forwardly projecting arm 26. The hub 84 is provided with one or more set screws 92 which permit of selective retraction of hub 84 along arm 26 from a position adjacent flange 82 and, in the retracted condition, the cutter head assembly 30 "floats" with respect to the forwardly projecting arm 26, that is, it is free to rotate relative to the longitudinal axis of arm 26.

A means for selectively causing the clutching and declutching of the pulley 40 with power transmission belt 41 is shown, and said means includes an elongated articulated actuator mechanism. The actuator mechanism includes an elongated actuator rod 94 which passes through an aperture in flange 82 and is threaded along a portion thereof and which carries a pair of manually adjustable nuts 96 and 98 on the threaded portion of the rod disposed on opposite sides of the upstanding portion of flange 82. The engagement of the nuts 96 and 98 with flange 82 will effect movement of the flange 82 and the upright bearing 32 in selected directions axially of the arm 26.

The rearward end of actuator rod 94 is connected to a linkage of the type described and shown in my copending application Serial No. 754,787, and the operation of which acts to selectively move said drive pulley 43 and driven pulley 40 toward each other to de-clutch the cutter means 38, or to move said pulleys 40 and 43 apart to effect an operative drive therebetween through the medium of endless belt 41.

When it is desired to use the mowing machine here described as a lawn mower, another bar 52 with wheel 54 attached may be secured to the other side of cutter head assembly 30 through flange 50 that is provided therefor.

In the modified form of device shown in FIGURES 6–8, the parts corresponding substantially in shape, location and function with parts previously described are similarly numbered.

Two specific variations are shown in FIGURES 6–8, to which attention is directed. In FIGURES 6 and 7, the forwardly extending bar 52′ has welded thereto one end of the pre-formed bar 58′, in such a manner that bar 58′ is caused to extend upwardly at 58a, rearwardly of the forward edge of wheel 54, and then bar 58′ sweeps transversely at 58b across wheel 54 and then extends rearwardly and downwardly toward the other side of the cutter head assembly.

The other modification lies in the details of the blade-pitch control means. In FIGURES 6–8, the sleeve 60 has welded thereto, on opposite sides, a pair of parallel plates 62. One of the plates carries belt retainer 63. The bearing 32 has a pair of parallel plates 68′ welded thereto and extending rearwardly therefrom. A pivot pin 72′ provides a pivot axis for relative pivoting between bearing 32 and sleeve 60 carried on arm 26 in substantially identical manner as in the earlier form described.

Now, while in FIGURES 1–5 the bearing 32 provided a flange 74 for carrying the screw control member 76, in the form of FIGURES 6–8 the plates 68′ are extended rearwardly of pin 72′ to provide a pair of flanges 68a. The flanges 68a are provided with journal apertures 100. A heavy bar 101 having a relatively large dimension central portion 102 and having reduced end portions 104 for journalling in apertures 100 is provided. The enlarged ends of central portion 102 abut the inner walls of flanges 68a. The outermost tips of reduced end portions 104 may be upset against the outer walls of flanges 68a, after assembly, so as to prevent inadvertent disassembly. The bar 101 is thus pivotable about its axis.

The sleeve 60 has an inverted U-shaped plate 106 welded on the top side thereof, thereby presenting the bight 108 of plate 106 in spaced relation from sleeve 60. The bight 108 is preferably parallel to the pivot axis of bar 101. A pitch-adjusting screw 110 having a manual grip 112 is threaded in tapped bore 114 extending through central portion 102 of bar 101. The lower end of screw 110 is reduced at 116 to rotatably extend through aperture 118 in bight 108. A washer 120 is disposed on reduced portion 116 between bight 108 and a cotter pin 122 carried by the bored tip of screw 110. A wing-type jam nut 124 is carried on screw 110 adapted for frictional jamming against the upper surface of bight 108.

From the foregoing it will be understood that variations in pitch of the cutter blade 38 relative to the ground is obtained by moving bight 108, and the sleeve 60 connected thereto, toward and away from bar 101 which carries screw 110. The bar 101 pivots to accommodate the relative movements and variations in attitude between the parts, and in that way there is no jamming or undue stress on screw 110. When a desired pitch is attained, the parts may be fixed at the selected attitude through jamming nut 124 against bight 108.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A pitch control for a mowing machine of the type including a wheel supported frame, drive means on said frame, an elongated support member projecting forwardly from the frame, and cutter means, driven by an endless belt from said drive means, mounted on said support member for pivoting about the longitudinal axis of said support member; said pitch control comprising, in combination: a sleeve telescopically mounted relative to the forward end of said support member, an elongated bearing separate from said sleeve and disposed so that its axis extends transversely to the longitudinal axis of said support member, means pivotally connecting said elongated bearing and said telescopically mounted sleeve to permit of selectively varying the angle between the axis of the bearing and the axis of the sleeve, an elongated shaft mounted in said bearing and having its ends projecting from both ends of said bearing, said cutter means being mounted on the lower end of said shaft for rotation in a plane transverse to the axis of said bearing, a driven pulley on the upper end of said shaft adapted to be driven by an endless belt, clutch control means engaging said sleeve for selectively moving said sleeve and elongated bearing pivoted thereto axially of said support member to selectively clutch or de-clutch the cutter means, and selectively adjustable pitch varying means engaging and interacting between said elongated bearing and said telescopically mounted sleeve for varying the pitch of said cutter means relative to the axis of said sleeve.

2. A pitch control for a mowing machine of the type including a wheel-supported frame and elongated support means projecting forwardly of said frame; said pitch control comprising, in combination: an elongated bearing positioned forwardly of the extended end of said support means and disposed with its axis extending transversely to the longitudinal axis of said support means, a ground-engaging support connected to said bearing and positioned forwardly thereof, cutter means carried by said bearing for rotation in a plane transverse to the axis of the bearing, means pivotally connecting said bearing and said support means for pivoting about a horizontal axis which lies transverse to the axes of both said support means and said bearing and which horizontal axis is spaced above said support means and rearward of said bearing, so that said ground-engaging support for said bearing serves in part as a support for said forwardly projecting support means and the wheel-supported frame serves in part as a support for said bearing and cutter means, a tapped adjustment-screw-support means carried by said bearing and extending rearwardly thereof above the extended end of said support means, an elongated upright adjustment screw threaded through said tapped screw-support means and having its upper end provided with handle means for selective adjustment and its lower end in operative engagement with said support means, whereby manipulation of the adjustment screw will selectively effect varying the included angle between the axis of the bearing and the axis of the support means so as to vary the pitch of the cutter means relative to the axis of the support means, and lost motion means between said adjustment screw and one of the said two means which said adjustment screw engages.

3. A device as set forth in claim 2 wherein the lost motion connection includes a sliding engagement by the lower end of the adjustment screw with the support means for longitudinal movement along said elongated support means.

4. A device as set forth in claim 2 wherein the lost motion connection includes the screw-support means having a support flange fixed to the bearing, a bar pivotably carried on the support flange and spaced from the axis of said pivot between the bearing and support means, and the elongated adjustment screw being threaded through said bar and arranged to pivot therewith.

5. A pitch control for a mowing machine of the type including a wheel-supported frame and elongated support means projecting forwardly of said frame; said pitch control comprising, in combination: an elongated bearing positioned forwardly of the extended end of said support means and disposed with its axis extending transversely to the longitudinal axis of said support means, a ground-engaging support connected to said bearing and positioned forwardly thereof, cutter means carried by said bearing for rotation in a plane transverse to the axis of the bearing, means pivotally connecting said bearing and said support means for pivoting about a horizontal axis which lies transverse to the axes of both said support means and said bearing and which horizontal axis is spaced above said support means and rearward of said bearing, so that said ground-engaging support for said bearing serves in part as a support for said forwardly projecting support means and the wheel-supported frame serves in part as a support for said bearing and cutter means, a tapped adjustment-screw-support means carried by said bearing and extending rearwardly thereof above the extended end of said support means, an elongated upright adjustment screw threaded through said tapped screw-support means and having its upper end provided with handle means for selective adjustment and its lower end in operative engagement with said support means, whereby manipulation of the adjustment screw will selectively effect varying the included angle between the axis of the bearing and the axis of the support means so as to vary the pitch of the cutter means relative to the axis of the support means, and selectively operative jam nut means carried by said adjustment screw for maintaining the pitch of the cutter means at a selected attitude.

6. A pitch control for a mowing machine of the type including a wheel-supported frame and elongated support means projecting forwardly of said frame; said pitch control comprising, in combination: an elongated bearing positioned forwardly of the extended end of said support means and disposed with its axis extending transversely to the longitudinal axis of said support means, a ground-engaging support connected to said bearing and positioned forwardly thereof, cutter means carried by said bearing for rotation in a plane transverse to the axis of the bearing, means pivotally connecting said bearing and said support means for pivoting about a horizontal axis which lies transverse to the axes of both said support means and said bearing and which horizontal axis is spaced above said support means and rearward of said bearing, so that said ground-engaging support for said bearing serves in part as a support for said forwardly projecting support means and the wheel-supported frame serves in part as a support for said bearing and cutter means, a tapped adjustment-screw-support means carried by said bearing and extending rearwardly thereof above the extended end of said support means, an elongated upright adjustment screw threaded through said tapped screw-support means and having its upper end provided with handle means for selective adjustment and its lower end in operative engagement with said support means, whereby manipulation of the adjustment screw will selectively effect varying the included angle between the axis of the bearing and the axis of the support means so as to vary the pitch of the cutter means relative to the axis of the support means, and spaced guide flanges carried by said support means and extending forwardly thereof for cooperation with said bearing to restrain lateral movement of said bearing relative to said support means.

References Cited in the file of this patent

UNITED STATES PATENTS

| | | |
|---|---|---|
| 2,410,273 | Deubner | Oct. 29, 1946 |
| 2,483,683 | Wells et al. | Oct. 4, 1949 |
| 2,504,259 | Ford | Apr. 18, 1950 |
| 2,618,919 | Hutchens | Nov. 25, 1952 |
| 2,663,137 | Asbury | Dec. 22, 1953 |
| 2,833,102 | Roof | May 6, 1958 |
| 2,855,742 | Cooper et al. | Oct. 14, 1958 |
| 2,862,344 | Caudle et al. | Dec. 2, 1958 |
| 2,909,021 | McLane | Oct. 20, 1959 |

FOREIGN PATENTS

| | | |
|---|---|---|
| 213,772 | Australia | Mar. 19, 1958 |